US006245140B1

(12) United States Patent
Monden et al.

(10) Patent No.: US 6,245,140 B1
(45) Date of Patent: Jun. 12, 2001

(54) SURFACE-FLUORINATED METAL OXIDE PARTICULATES, PROCESS FOR MANUFACTURING THE SAME, AND USE OF THE SAME

(75) Inventors: Ryuji Monden; Chozo Inoue, both of Chiba; Jun Tanaka, Toyama; Hiroyuki Hagihara, Shiojiri; Hiroyasu Taguchi, Kawasaki; Hiroyuki Takahashi, Tokyo; Manabu Ohira, Chiba; Katsura Ito, Shiojiri, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 08/994,984

(22) Filed: Dec. 19, 1997

Related U.S. Application Data

(60) Provisional application No. 60/047,100, filed on May 19, 1997.

(30) Foreign Application Priority Data

Dec. 19, 1996 (JP) .................................................. 8-339806
Mar. 26, 1997 (JP) .................................................. 9-073899

(51) Int. Cl.$^7$ ........................................................ C09D 1/00
(52) U.S. Cl. .................. 106/286.4; 106/437; 524/413; 524/441; 524/442; 524/513; 524/543; 524/577; 524/593; 524/567; 524/565
(58) Field of Search ............................ 106/286.4, 437; 524/413, 441, 442, 513, 543, 577, 593, 567, 565

(56) References Cited

U.S. PATENT DOCUMENTS

| 4,416,699 | 11/1983 | Jacobson | 106/300 |
| 4,460,655 | 7/1984 | Jacobson | 428/530 |
| 5,556,732 | * 9/1996 | Chow | 430/137 |

FOREIGN PATENT DOCUMENTS

| 55-154317 | * 12/1980 | (JP) . |
| 59-184263 | * 10/1984 | (JP) . |
| 61-215216 | 9/1986 | (JP) . |
| 9-40919 | 2/1991 | (JP) . |

OTHER PUBLICATIONS

Patent Abstracts of Japan vol. 018, No. 337 (C–1217), Jun. 27, 1994 & JP 06 080901 A (Mitsubishi Pencil Co Ltd), Mar. 22, 1994 * abstract*.
Database WPI Section Ch, Week 9037 Derwent Publications Ltd., London, GB; Class L03, AN 90–279376 XP002094786 & JP 02 197014 A (Mitsubishi Metal Corp), Aug. 3, 1990 *abstract*.
Database WPI Section Ch, Week 9114 Derwent Publications Ltd., London, GB; Class A60, AN 91–097656 XP002094787 & JP 03 040919 (Idemitsu Kosan Co. Ltd), Feb. 21, 1991 *abstract*.

* cited by examiner

Primary Examiner—Dwayne C. Jones
Assistant Examiner—C. Delacroix-Muirheid
(74) Attorney, Agent, or Firm—Sughrue, Mion, Zinn, Macpeak & Seas, PLLC

(57) ABSTRACT

A surface-fluorinated metal oxide particulate comprising a metal oxide particulate selected from titanium, aluminum, silicon, silver, copper, zirconium, zinc, tin, germanium, tantalum and the like, being reacted with fluorine and a process for manufacturing such surface-treated metal oxide particulates are disclosed. The process allows easy and efficient fluorination of the surface of metal oxide particulates in any desired ratio. The surface-fluorinated metal oxide particulates of the present invention are useful as an additive for weatherable paints, weatherable resins, cosmetics and the like. Surface-fluorinated titanium oxide particulates obtained by fluorination of titanium oxide particulates have improved light stability, water-repellence, and dispersibility as compared with conventional titanium oxide particulates and maintains surface smoothness of the resin-coated substrate when contained in high concentrations in thermoplastic resins as a white pigment with water content being controlled in a specified range and prevents the occurrence of troubles at the time of melt extrusion coating for obtaining resin-coated substrates.

6 Claims, 1 Drawing Sheet

SURFACE-FLUORINATED METAL OXIDE PARTICULATES, PROCESS FOR MANUFACTURING THE SAME, AND USE OF THE SAME

CROSS REFERENCE TO RELATED APPLICATIONS

This application is an application filed under 35 U.S.C. §111(a) claiming benefit pursuant to 35 U.S.C. §119(e)(i) of the filing date of the Provisional Application 60/047,100, filed May 19, 1997, pursuant to 35 U.S.C. §111 (b).

BACKGROUND ART

1. Field of the Invention

The present invention relates to the manufacture of surface-fluorinated metal oxide particulates. More specifically, the present invention relates to surface-fluorinated metal oxide particulates whose surface affinity being controlled from 'hydrophilic' to 'hydrophobic' and which has improved stability, water repellent and dispersibility, a process for manufacturing the same and use of the same.

2. Description of the Related Art

Metal oxide particulates are used for a wide variety of applications and useful as raw materials of paints, matting agents for synthetic fibers, printing ink, cosmetics, opal glass, etc. and as coloring agents for rubbers and resins, pigments; and the like.

The surface of a metal oxide particulate is usually covered with a hydroxyl group and exhibits hydrophilicity. Accordingly, when the metal oxide particulates are blend in a resin, a paint or a cosmetic, a large number of surface treatments such as treatment with a higher fatty acid, treatment with an organic silicon compound, silica-alumina treatment and treatment with various coupling agents, are being attempted and practiced so as to improve dispersibility, for example, of titanium oxide. Also, there has been attempted surface treatment of aluminum oxide or silicon oxide with a silylating agent or the like.

These methods all intend to control the hydrophobicity or hydrophilicity or control the surface activity by the substitution-elimination of hydroxyl groups on the surface of a metal oxide particulate.

However, when this metal oxide particulate is added to fluororesin or the like, higher hydrophobicity and higher lipophobicity are demanded and accordingly, it is necessary to form a surface covered with fluorine having a surface energy lower than water or oil.

As the technique for solving this problem, for example, JP-A-59-184263 (the term "JP-A" as used herein means an "unexamined published Japanese patent application") discloses a method of adding sodium fluoride to a suspension slurry of titanium oxide and stirring the mixture. However, according to this method, in the case when titanium oxide is an ultrafine particulate, coagulation in the drying process is intensified and good dispersibility cannot be obtained even if the matters coagulated are crushed. Further, according to this method, the fluorine atom is not bonded directly to the titanium atom and it cannot be said that the titanium oxide surface is fluorinated or modified with fluorine.

JP-A-61-215216 discloses a method of using an organic fluorine compound as a hydrophobicity-imparting substance in the production of hydrophobic spherical titanium oxide particulates. However, also in this case, the titanium oxide surface is substantially not modified with fluorine.

JP-A-3-40919 discloses a method of bringing freon gas into contact with titanium oxide ultrafine particulates and modifying their surface with fluorine at a high temperature of from 200 to 400° C. However, use of the reaction temperature as high as 200° C. or more results in the thermal efficiency which is not always good.

With respect to aluminum oxide and silicon oxide, nothing has been known about the fluorination of the surface of the particulates thereof.

SUMMARY OF THE INVENTION

The present invention is to solve these problems involved in the conventional techniques and provides surface fluorinated metal oxide particulates and a process for manufacturing the same.

Another object of the present invention is to provide a thermoplastic resin composition containing surface-fluorinated titanium oxide particulate pigment as a specific use of surface-fluorinated titanium oxide particulate, for one example of the surface-fluorinated metal oxide particulates described above.

As a result of extensive investigations to solve these problems in the conventional techniques, the present inventors have found that when a metal oxide particulate is reacted with fluorine, there can be obtained a substantially surface-fluorinated metal oxide particulate, which is accordingly water-repellent and oil-repellent.

Also, the present inventors have confirmed that among surface-fluorinated metal oxides, a surface-fluorinated titanium oxide particulate has been improved on light stability, water-repellence, and dispersibility over the conventional titanium oxide particulates and accordingly is particularly suitable for use in thermoplastic resin compositions for photographic resin coating paper such as highly white thin film composed of a thermoplastic resin containing a titanium oxide particulate as a white pigment.

Base on these findings, the present invention provides surface-fluorinated metal oxide particulates, a process for manufacturing the same and a thermoplastic resin composition containing surface-fluorinated titanium oxide particulate pigment as below.

1) A process for manufacturing surface-fluorinated metal oxide particulates, comprising reacting a metal oxide particulate with fluorine.

2) The process for manufacturing surface-fluorinated metal oxide particulates as described in 1) above, wherein a fluorine-containing gas is used which contains fluorine and a diluent gas.

3) The process for manufacturing surface-fluorinated metal oxide particulates as described in 2) above, wherein the diluent gas is nitrogen or argon.

4) The process for manufacturing surface-fluorinated metal oxide particulates as described in any one of 1) to 3) above, wherein at least one of reaction time and gas concentration of raw material fluorine is controlled to obtain a surface-fluorinated metal oxide particulate with a controlled surface-fluorination rate.

5) The process for manufacturing surface-fluorinated metal oxide particulates as described in any one of 1) to 4) above, wherein the metal oxide is titanium oxide.

6) The process for manufacturing surface-fluorinated metal oxide part-culates as described in any one of 1) to 4) above, wherein the metal oxide is aluminum oxide.

7) The process for manufacturing surface-fluorinated metal oxide particulates as described in any one of 1) to 4) above, wherein the metal oxide is silicon oxide.

8) A surface-fluorinated metal oxide particulate.

9) The metal oxide particulate as described in 9) above, wherein the metal oxide particle is obtained by any one of the methods 1) to 7) above and has a substantially fluorinated surface.

10) The metal oxide particulate having a substantially fluorinated surface as described in 8) or 9) above, wherein the metal oxide is aluminum oxide.

11) The metal oxide particulate having a substantially fluorinated surface as described in 8) or 9) above, wherein the metal oxide is silicon oxide.

12) The metal oxide particulate having a substantially fluorinated surface as described in 8) or 9) above, wherein the metal oxide is titanium oxide.

13) A thermoplastic resin composition containing a surface-fluorinated titanium oxide particulate pigment, which is a thermoplastic resin composition containing titanium dioxide pigment for coating on a substrate, wherein the composition comprises the surface-fluorinated titanium oxide particulate pigment as described in 12) above and has a water content of 10 to 1,400 ppm as determined by moisture conditioning 3 g of the composition in an atmosphere of 60 ° C. and relative humidity of 60% for 4 hours, exposing the thus conditioned composition to an air stream of absolute humidity of 0.009 kg $H_2O$/kg of dry air at 80 ° C. for 4 hours, degassing the composition at 300° C. for 30 minutes, measuring the moisture content (g) of the composition using a Karl-Fischer moisture meter, and dividing the amount of moisture thus obtained by the surface-fluorinated titanium dioxide content (g).

14) A thermoplastic resin composition containing a surface-fluorinated titanium dioxide particulate pigment as described in 13) above, wherein the composition contains 20 to 80% by weight of the surface-fluorinated titanium dioxide particulate pigment.

15) A thermoplastic resin composition containing a surface-fluorinated titanium dioxide particulate pigment as described in 13) or 14) above, wherein titanium dioxide containing 0.001 to 0.2 parts by weight, per 100 parts by weight of titanium dioxide, of at least one of aluminum oxide, silicon oxide and zirconium oxide is fluorinated so that surface fluorine content is 0.001 to 61% by weight, and then is kneaded with a thermoplastic resin.

16) A master batch of a thermoplastic resin composition containing a surface-fluorinated titanium oxide particulate pigment, which is a master batch of a thermoplastic resin composition containing a high concentration of titanium dioxide pigment for coating on a substrate, wherein the composition comprises the surface-fluorinated titanium oxide particulate pigment as described in 12) above and has a water content of 10 to 1,400 ppm as determined by moisture conditioning 3 g of the composition in an atmosphere of 60° C. and relative humidity of 60% for 4 hours, exposing the thus conditioned composition to an air stream of absolute humidity of 0.009 kg $H_2O$/kg of dry air at 80° C. for 4 hours, degassing the composition at 300° C. for 30 minutes, measuring the moisture content (g) of the composition using a Karl-Fischer moisture meter, and dividing the value obtained by the surface-fluorinated titanium dioxide content (g).

17) The master batch of a thermoplastic resin composition containing a surface-fluorinated titanium oxide particulate pigment as described in 16) above, wherein the master batch contains 30 to 80% by weight of the surface-fluorinated titanium oxide particulate pigment.

18) A molded master batch of a thermoplastic resin composition containing a surface-fluorinated titanium dioxide particulate pigment as described in 16) or 17) above, wherein titanium dioxide containing 0.001 to 0.2 parts by weight, per 100 parts by weight of titanium dioxide, of at least one of aluminum oxide, silicon oxide and zirconium oxide is fluorinated so that surface fluorine content is 0.001 to 61% by weight and then kneaded with a thermoplastic resin, the resulting composition together with a substrate being extruded.

DETAILED DESCRIPTION OF THE INVENTION

"Fluorination of metal oxide particulates"

Figure 1:
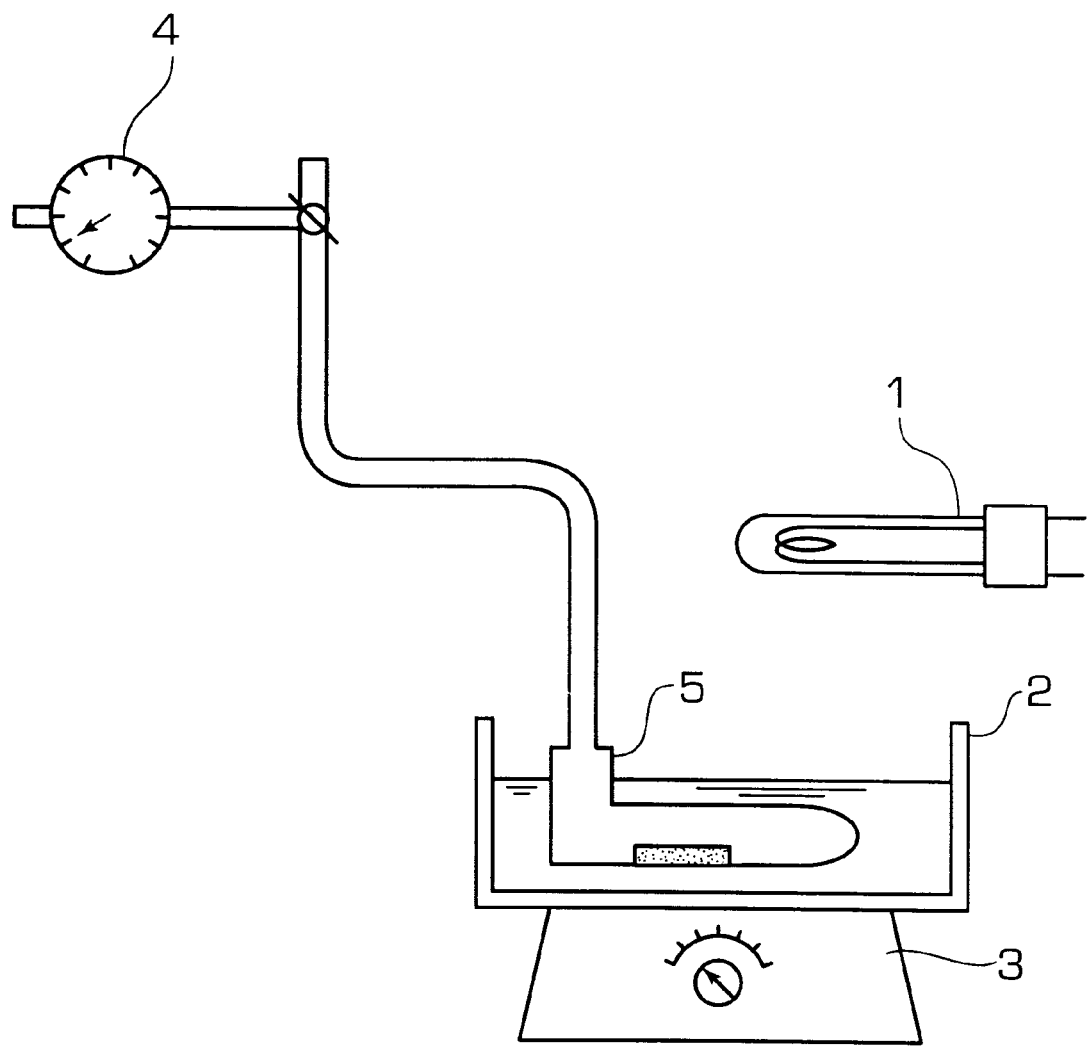
FIG. 1 is a schematic drawing showing a reactor used in tests for confirming the catalyst activity on a photochemical reaction of surface-fluorinated titanium oxide particulates of the present invention.

The process for manufacturing metal oxide particulates whose surface is fluorinated or modified with fluorine (herein abbreviated as "surface-fluorinated metal oxide particulates") is characterized by reacting metal oxide particulates with fluorine to substantially fluorinate the surface of the particulates or by controlling the fluorination in any desired ratio.

The term "substantially" as used herein means that nearly the entire surface of a metal oxide particulate is modified with fluorine, i.e., fluorinated. However, the surfacedoes not have to be modified in 100% with fluorine or uniformly over all the surface. In this connection, the ratio of fluorination of the surface of particulates is determined from all the elements existing from the surface of the particulates to the depth of about 100 Å as measured by XPS (X-ray photoelectron spectroscopy). For example, if all (100% of) the Ti on the surface consists of titanium oxide would be converted to $TiF_4$ as a result of fluorination of titanium oxide, the fluorine content of the surface of a particulate could be 61.3% by weight as calculated: $(4F/TiF_4) \times 100 = 61.3\%$.

The term "metal oxide" as used in the present invention means an oxide of a metal, and examples thereof include oxides of titanium, aluminum, silicon, silver, copper, zirconium, zinc, tin, germanium and tantalum. In particular, oxides of titanium, aluminum and silicon are preferred.

The particle diameter, specific surface area, crystal type and the like of the metal oxide particulate used as the raw material are not limited particularly and various metal oxide particulates may be used. Usually, those having an average primary particle size of 1,000 μm or less, preferably 100 μm or less, more preferably from 0.005 to 1 μm, and a very large specific surface area of 0.01 m²/g or more, preferably from 3 to 300 m²/g (according to the BET method) are used. With respect to the crystallinity, the titanium oxide may be any of noncrystalline, anatase, brookite and rutile; the aluminum oxide may be any of noncrystalline, α-alumina and γ-alumina; and the silicon oxide may be either of silicic acid anhydride and synthetic silicic acid.

The fluorination reaction for manufacturing metal oxide particulates used as the raw material is a gas phase process, which is carried out, for example, as follows. The above-described metal oxide particulates are filled into a reactor of atmospheric gas phase flow system or the like, the reactor is heated at a predetermined temperature, fluorine gas is filled into the reactor, and these are reacted for a predetermined time to effect surface fluorination treatment.

The heating temperature of the reactor, in other words, the reaction temperature is usually from 0 to 200° C., preferably from 20 to 150° C.

The reaction time is usually from instant to 3 hours, preferably from instant to 1 hour.

The flow rate of fluorine gas is usually from 0.1 to 100 ml/g.min, preferably from 0.5 to 50 ml/g.min. In the case of small amount flowing, a batch system can be used. The fluorine gas concentration is suitably 100%. However, at least 0.01% by volume, preferably at least 0.1% by volume, and more preferably at least 1% by volume of fluorine gas diluted with nitrogen or argon is also usable. The adjustment of concentration of fluorine gas and/or reaction time allows easy control of fluorination ratio on the surface of a particulate.

The surface-fluorinated metal oxide particulates obtained by the method of the present invention described above have an average primary particle diameter of 1,000 $\mu$m or less, preferably 100 $\mu$m or less, more preferably from 0.005 to 1 $\mu$m (fine particulate or ultrafine particulate). The surface-fluorinate metal oxide particulate of the present invention has a very large specific surface area of 0.01 $m^2/g$ or more, preferably from 3 to 300 $m^2/g$ (according to the BET method).

The surface-fluorinated metal oxide particulates of the present invention exhibit water-repellent and oil-repellent effects and are excellent in resistance to acids and alkalis. Further, the surface-fluorinated metal oxide particulates of the present invention have excellent dispersibility, which is convenient when they are added and blended with Teflon resin for the purpose of improving light stability, weatherability, hiding power, and whiteness, controlling refractive index, absorbing ultraviolet rays, and so on.

Therefore, the surface-fluorinated metal oxide particulates of the present invention is very useful as an additive to weatherable paints, weatherable resins, cosmetics and so on.

Further, according to the process of the present invention, the surface of metal oxide particulates can be freely fluorinated in any desired ratio very easily and efficiently so that the present invention is very useful in industries.

"Thermoplastic Resin Composition Containing Surface-Fluorinated Titanium Oxide Pigment"

Next, among the surface-fluorinated metal oxide particulates of the present invention, description will be made of a surface-fluorinated titanium oxide which is suitable for use in photographic thermoplastic resin compositions for photographic resin-coated paper such as highly white thin film.

Titanium dioxide is widely used as a white pigment or the like for use in photographic thermoplastic resin composition for photographic resin-coated paper such as highly white thin film and the like. Titanium dioxide blended for such a purpose is surface treated with aluminum oxide, silicon oxide, titanium oxide, zirconium oxide, magnesium oxide or hydrates thereof in order to inhibit optical activity or improve weatherability or dispersibility as a pigment. Of these, a surface treatment with aluminum oxide hydrate for inhibiting optical activity is generally used and various processes have been proposed therefor.

For example, U.S. Pat. No. 4,416,699 proposes a process including the steps of (1) adding a predetermined amount of titanium dioxide to water to form a slurry; (2) adjusting the temperature of the slurry to a predetermined range; (3) adding a soluble aluminum compound to the slurry and allowing it to dissolve; and (4) aging the mixture at a predetermined temperature and at a predetermined pH for a predetermined period of time.

Also, JP-A-55-154317 proposes a process which includes the steps of dispersing 100 to 500 g/l, preferably 250 to 400 g/l, of titanic acid or titanium dioxide in water to form a slurry; adding sodium aluminate and optionally a dispersant, if desired, to the slurry in order to well disperse titanic acid or titanium dioxide; and neutralizing the slurry with an acid to deposit aluminum oxide hydrate.

The amount of the inorganic oxide or hydrates thereof used in the treatment is generally 0.1 to 5 parts by weight per 100 parts by weight of titanium dioxide.

In order to coat one or both surfaces of a substrate such as paper or polyester with thermoplastic resin composition containing titanium dioxide pigment, there is generally used a melt-extrusion lamination processing method.

Recently, the resin-coated paper is required to have even more excellent whiteness and high opacity. However, there arises a problem that the coating film is in a poor condition due to poor dispersion of titanium dioxide.

The term "poor condition of a coating film" means that the film has a poor surface smoothness, bubbles are contained in the film or otherwise undesirable condition, which causes a further problem that lamination molding has to be interrupted or stable, high speed molding is difficult to carry out.

Accordingly, the present inventors have investigated extensively on a resin composition and its master batch with view to (1) realizing a good surface condition such that when a resin containing titanium dioxide to be added as a filler mainly for imparting high opacity or whiteness is coated in the form of a thin film on a carrier such as paper or the like, use of an increased concentration of the filler gives rise to a minimized amount of "microgrits," which are relatively solid and fine foreign matter like prongs, and "gel," i.e., relatively soft, fine hill-like foreign matter occurring on the film surface; (2) preventing the occurrence of troubles upon processing when melt extrusion coating is carried out in order to obtain such a resin coated paper or resin coated carrier; and (3) preventing melt-flow-rate (MFR) from decreasing due to addition of titanium dioxide pigment and increasing its fluidity.

As a result, the present inventors have confirmed the followings. In order to assure a good condition of the coating on a substrate with a titanium dioxide-containing resin composition, excellent surface smoothness, and no inclusion of bubbles into the film, it is important to use a titanium dioxide pigment that has an excellent dispersibility in a thermoplastic resin, suffers from less decrease in MFR and has an improved fluidity. For this purpose, surface-fluorinated titanium oxide particulates are most suitable. Further, the main cause of poor dispersibility upon blending titanium dioxide in a resin is largely attributable to the moisture content in the resin composition and master batch. Accordingly, it is important to control the moisture content of the resin composition and master batch to a certain low level (10 to 1,400 ppm). The thermoplastic resin composition containing surface-fluorinated titanium oxide particulate pigment and its master batch of the present invention are reached based on the knowledge.

As described above, titanium dioxide, which is the raw material of the surface-fluorinated titanium oxide particulates used in the thermoplastic resin composition of the present invention may be any one of noncrystalline, anatase, brookite, and rutile. Those manufactured by any one of a chlorine process, a sulfuric acid process, a gas phase process, a liquid phase process and the like.

The surface fluorination of titanium oxide can be carried out by the above-mentioned process.

The fluorine content of the surface-fluorinated titanium oxide particulates used in the present invention as determined by XPS is preferably 0.001 to 61% by weight, more preferably 0.1 to 61% by weight.

The particle diameter of titanium dioxide is desirably an average particle diameter of 0 02 to 1.0 $\mu$m in order to improve optical properties of the thermoplastic resin composition. Outside this range, optical properties such as light scattering, color hue and the like are aggravated considerably.

Because of fluorine chemically bonded on its surface, the titanium dioxide described above is excellent in improvement of light stability, water repellence and dispersibility.

In the present invention, an other metal oxide-containing titanium dioxide, which contains one or more of aluminum oxide, silicon oxide, zirconium oxide and the like, in an amount of 0.001 to 0.2 part by weight per 100 parts by weight of titanium dioxide may be fluorinated in order to increase the dispersibility of titanium dioxide at the time of preparing a master batch.

In this case too, the fluorine content of the surface-fluorinated titanium oxide particulates used in the present invention as determined by XPS is preferably 0.001 to 61% by weight, more preferably 0.1 to 61% by weight, of the titanium dioxide surface containing the other metal oxide.

Then, the titanium dioxide thus surface-fluorinated is kneaded with a thermoplastic resin. Kneader is not limited particularly but there can be used various types of kneaders including a batch type one such as Banbury mixer, a twin-screw kneader, a single-screw extruder having a kneading function and so on.

Examples of the thermoplastic resin used in the resin composition of the present invention include polyolefins such as polyethylene, polypropylene, ethylene/propylene copolymers (inclusive of random or block copolymers), polystyrenes, etc., ABS resin, AS resin, polyvinyl chlorides, polyesters, polyacetals, polycarbonates, poly(aromatic cyclic ether)s, poly(aromatic cyclic ester)s, polyamides, polysulfones, and the like. Preferred are polyolefins.

In the present invention, the thermoplastic resin as described above and surface-fluorinated titanium oxide particulates may be kneaded to form the surface-fluorinated titanium dioxide pigment-containing thermoplastic resin composition or a master batch may be prepared which contains the surface-fluorinated titanium oxide particulate pigment in a high content.

Further, in the present invention, a metal soap such as zinc stearate, an antioxidant or the like may be added prior to kneading the surface-fluorinated titanium oxide particulates with the thermoplastic resin or upon kneading in order to increase the lubricity or dispersibility of the composition. The metal soap is added desirably in an amount of 0.1 to 10 parts by weight per 100 parts by weight of titanium dioxide. It is desired that the antioxidant be added in an amount of 0.001 to 0.1 part by weight per 100 parts by weight of titanium dioxide.

Generally, a high concentration of titanium dioxide pigment, which is subjected to the surface-fluorination treatment as described above, is kneaded with a resin, and a master batch processed into pellets is prepared at first, followed by blending an uncolored resin (containing no pigment) and the master batch to form a resin composition.

The master batch contains 30 to 80% by weight of the surface-fluorinated titanium dioxide pigment per 100 parts by eight of the raw material resin. On the other hand, the resin composition contains 20 to 80% by weight of the surface-treated titanium dioxide pigment per 100 parts by weight of the raw material resin.

In the case of master batch, when the concentration of the pigment is below 30% by weight, the concentration of the pigment is too low to obtain sufficient optical properties such as high opacity and whiteness when a resin composition is formed therefrom, while the pigment concentration of above 80% by weight is undesirable since it is difficult to uniformly disperse the pigment during the preparation of a master batch. On the other hand, in the resin composition, the pigment concentrations of below 20% by weight result in a difficulty of obtaining high optical properties, while use of a pigment concentration of above 80% by weight is undesirable since film defect such as foaming tends to occur due to vaporization of the moisture that is incorporated as entrained by the pigment upon the formation of a high whiteness thin film.

The thermoplastic resin composition of the present invention having a water content adjusted to a low level that is not attained heretofore and a master batch thereof cannot be obtained until the above-described manufacturing process is used.

Although the raw material resin itself manufactured by an ordinary process has a sufficiently low water content of about 500 ppm or less, film defects occur due to contamination of water during addition and blending of hygroscopic metal oxide particulates. In contrast thereto, according to the process of the present invention, the water content is decreased to a low level during the reaction with fluorine of the surface of titanium oxide or titanium oxide containing aluminum oxide, silicon oxide, zirconium oxide or the like and this low level of water absorption is maintained so that the incorporation of water into the resin composition is prevented during the mixing of the resin with the surface-fluorinated titanium oxide particulates, thus providing a resin composition containing the surface-fluorinated metal oxide particulates with its water content being controlled to a low level.

In other words, use of surface-fluorinated titanium oxide particulates or surface-fluorinated titanium oxide containing one or more other metal oxides obtained by a gas phase process can facilitate the manufacture of the resin composition of the present invention having a water content of 10 to 1,400 ppm as determined as described below and a master batch thereof.

The term "water content" as used herein refers to a value obtained by the amount (g) of moisture as determined by moisture conditioning 3 g of the composition in an atmosphere of 60° C. and relative humidity of 60% for 4 hours, exposing the thus conditioned composition to an air stream of absolute humidity of 0.009 kg $H_2O$/kg of dry air at 80° C. for 4 hours, degassing the composition at 300° C. for 30 minutes, measuring the moisture content (g) of the composition using a Karl-Fischer moisture meter, and dividing the amount of the moisture thus obtained by the surface-fluorinated titanium dioxide content (g).

With the water content above 1,400 ppm in the resin composition or master batch as described above, various defects on the film surface will increase upon film formation by a melt lamination method. This causes a practical problem to be overcome. On the other hand, with the water content below 10 ppm, a problem occurs as to the stability of the titanium dioxide pigment and at the same time the film has poor optical properties and poor smoothness. More preferred water content is 10 to 1,000 ppm.

In the present invention, the water content is controlled to a sufficiently low level as described above and the surface-fluorinated titanium oxide particulates are used as the titanium dioxide, which is well dispersed in the thermoplastic resin and which has improved fluidity so that a decrease in MFR hardly occurs and accordingly, when the resin composition is molded into a thin film with an increased content of the surface-fluorinated titanium oxide particulate, there can be obtained resin-coated paper or the like with a good film condition which is excellent in surface smoothness and fluidity.

BEST MODE FOR CARRYING OUT THE INVENTION

The surface-fluorinated metal oxide particulates and process for manufacturing the same of the present invention are described in greater detail below by referring to the Examples. However, the present invention should not be construed as being limited to these Examples. In the following, particularly, titanium oxide, aluminum oxide and silicon oxide are described.

In the Examples below, the specific surface area of metal oxide particulates is measured by the BET method. The fluorine contents of the surface of the particulates indicate the ratio (% by weight) to the total constituent elements on the surface of specimen measured by XPS but excludes the carbon introduced by contamination.

MANUFACTURING EXAMPLE 1

Titanium Dioxide Particulate

Titanium tetrachloride as a raw material was introduced at a rate of 189 g/hr into a vaporizer heated at 140° C. together with 1.05 $Nm^2$/hr of nitrogen gas as a carrier gas, and the raw material was completely vaporized. On the other hand, 1,200 g/hr of water was introduced into a vaporizer heated at 450° C. together with 2.26 $Nm^2$/hr of nitrogen gas to prepare superheated steam. This superheated steam was introduced into a reactor having an inner diameter of 30 mm simultaneously with the vaporized raw material and hydrolysis reaction was performed at 260° C. Thus, titanium dioxide particulates were obtained. The particulates were observed through an electron microscope and found to have an average primary particle size of 0.02 μm. Further, the particulates were verified to be noncrystalline by the X-ray diffraction pattern. Furthermore, the specific surface area determined by the BET method using nitrogen gas was 55 $m^2$/g.

MANUFACTURING EXAMPLE 2

Aluminum Oxide Particulate

Aluminum chloride as a raw material was introduced at a rate of 315 g/hr into a vaporizer heated at 300° C. together with 1.05 $Nm^2$/hr of nitrogen gas as a carrier gas, and the raw material was completely vaporized. On the other hand, 1,200 g/hr of water was introduced into a vaporizer heated at 450° C. together with 2.26 $Nm^2$/hr of nitrogen gas to prepare superheated steam. This superheated steam was introduced into a reactor having an inner diameter of 30 mm simultaneously with the vaporized raw material and hydrolysis reaction was performed at 260° C. Thus, aluminum oxide particulates were obtained. The particulates were observed through an electron microscope and found to have an average primary particle size of 0.02 μm. Further, the particulates were verified to be noncrystalline by the X-ray diffraction pattern. Furthermore, the specific surface area determined by the BET method using nitrogen gas was 100 $m^2$/g.

MANUFACTURING EXAMPLE 3

Silicon Dioxide Particulate

Silicon tetrachloride as a raw material was introduced at a rate of 401 g/hr into a vaporizer heated at 100° C. together with 1.05 $Nm^2$/hr of nitrogen gas as a carrier gas, and the raw material was completely vaporized. On the other hand, 1,200 g/hr of water was introduced into a vaporizer heated at 450° C. together with 2.26 $Nm^2$ hr of nitrogen gas to prepare superheated steam. This superheated steam was introduced into a reactor having an inner diameter of 30 mm simultaneously with the vaporized raw material and hydrolysis reaction was performed at 260° C. Thus, silicon dioxide particulates were obtained. The particulates were observed through an electron microscope and found to have an average primary particle size of 0.02 μm. Further, the particulates were verified to be noncrystalline by the X-ray diffraction pattern. Furthermore, the specific surface area determined by the BET method using nitrogen gas was 120 $m^2$/g.

EXAMPLE 1

Fluorination of Titanium Dioxide Particulates 1 g of titanium dioxide particulates (specific surface area: 55 $m^2$/g) prepared in Manufacturing Example 1 were filled into a reactor of atmospheric gas phase flow system and calcined as the pretreatment at 200° C. for 1 hour under reduced pressure. After cooling to 20° C., gas obtained by diluting fluorine gas with nitrogen gas (fluorine gas content: 20% by volume) was charged into this reactor for 15 minutes to perform surface fluorination. The resulting surface-fluorinated titanium dioxide particulate had a specific surface area of 55 $m^2$/g and thus, maintained its high specific surface area. The fluorine content on the surface of titanium dioxide particulate was quantified by XPS and as a result, the fluorine atom was 10%. The results obtained are shown in Table 1.

EXAMPLE2

Fluorination of Titanium Dioxide Particulates 1 g of titanium dioxide particulates (specific surface area: 55 $m^2$/g) prepared in Manufacturing Example 1 were filled into a reactor of atmospheric gas phase flow system and calcined as the pretreatment at 200° C. for 1 hour under reduced pressure. After cooling to 70° C., gas obtained by diluting fluorine gas with nitrogen gas (fluorine gas content: 20% by volume) was charged into this reactor for 15 minutes to perform surface fluorination. The resulting surface-fluorinated titanium dioxide particulate had a specific surface area of 51 $m^2$/g and thus, maintained its high specific surface area. The fluorine content on the surface of titanium dioxide particulate was quantified by XPS and as a result, the fluorine atom was 14%. The results obtained are shown in Table 1.

EXAMPLE 3

Fluorination of Titanium Dioxide Particulates 1 g of titanium dioxide particulates (specific surface area: 55 $m^2$/g) prepared in Manufacturing Example 1 were filled into a reactor of atmospheric gas phase flow system and calcined as the pretreatment at 200° C. for 1 hour under reduced pressure. After cooling to 150° C., gas obtained by diluting fluorine gas with nitrogen gas was (fluorine gas content: 20% by volume) charged into this reactor for 15 minutes to perform surface fluorination. The resulting surface-fluorinated titanium dioxide particulate had a specific surface area of 52 $m^2$/g and thus, maintained its high specific surface area. The fluorine content on the surface of titanium dioxide particulate was quantified by XPS and as a result, the fluorine atom was 19%. The results obtained are shown in Table 1.

EXAMPLE 4

Fluorination of Titanium Dioxide Particulates 1 g of titanium dioxide particulates (specific surface area: 55 m$^2$/g) prepared in Manufacturing Example 1 were filled into a reactor of atmospheric gas phase flow system and gas obtained by diluting fluorine gas with nitrogen gas (fluorine gas content: 1% by volume) was charged into this reactor at room temperature for 15 minutes to perform surface fluorination. The resulting surface-fluorinated titanium dioxide particulate had a specific surface area of 55 m$^2$/g and thus, maintained its high specific surface area. The fluorine content on the surface of titanium dioxide particulate was quantified by XPS and as a result, the fluorine atom was 12%. The photoactivity was sufficiently restrained. The results obtained are shown in Table 1.

EXAMPLE 5

Fluorination of Titanium Dioxide Particulates 1 g of titanium dioxide particulates (specific surface area: 55 m$^2$/g) prepared in Manufacturing Example 1 were filled into a reactor of atmospheric gas phase flow system and gas obtained by diluting fluorine gas with nitrogen gas (fluorine gas content: 20% by volume) was charged into this reactor at room temperature for 15 minutes to perform surface fluorination. The resulting surface-fluorinated titanium dioxide particulate had a specific surface area of 53 m$^2$/g and thus, maintained its high specific surface area. The fluorine content on the surface of titanium dioxide particulate was quantified by XPS and as a result, the fluorine atom was 22%. The results obtained are shown in Table 1.

EXAMPLE 6

Fluorination of Titanium Dioxide Particulates 1 g of titanium dioxide particulates (specific surface area: 55 m$^2$/g) prepared in Manufacturing Example 1 were filled into a reactor of atmospheric gas phase flow system and gas obtained by diluting fluorine gas with nitrogen gas (fluorine gas content: 20% by volume) was charged into this reactor at 70° C. for 15 minutes to perform surface fluorination. The resulting surface-fluorinated titanium dioxide particulate had a specific surface area of 52 m$^2$/g and thus, maintained its high specific surface area. The fluorine content on the surface of titanium dioxide particulate was quantified by XPS and as a result, the fluorine atom was 24%. The results obtained are shown in Table 1.

EXAMPLE 7

Fluorination of Aluminum Oxide Particulates 1 g of aluminum oxide particulates (specific surface area: 100 m$^2$/g) prepared in Manufacturing Example 2 were filled into a reactor of atmospheric gas phase flow system and gas obtained by diluting fluorine gas with nitrogen gas (fluorine gas content: 20% by volume) was charged into this reactor at room temperature for 5 minutes to perform surface fluorination. The resulting surface-fluorinated aluminum oxide particulate had a specific surface area of 98 m$^2$/g and thus, maintained its high specific surface area. The fluorine content on the surface of aluminum oxide particulate was quantified by XPS and as a result, the fluorine atom was 21%. The results obtained are shown in Table 1.

EXAMPLE 8

Fluorination of Aluminum Oxide Particulates 1 g of aluminum oxide particulates (specific surface area: 100 m$^2$/g) prepared in Manufacturing Example 2 were filled into a reactor of atmospheric gas phase flow system and calcined as the pretreatment at 200° C. for 1 hour under reduced pressure. After cooling to 70° C., gas obtained by diluting fluorine gas with nitrogen gas (fluorine gas content: 20% by volume) was charged into this reactor for 15 minutes to perform surface fluorination. The resulting surface-fluorinated aluminum oxide particulate had a specific surface area of 95 m$^2$/g and thus, maintained its high specific surface area. The fluorine content on the surface of aluminum oxide particulate was quantified by XPS and as a result, the fluorine atom was 31%. The results obtained are shown in Table 1.

EXAMPLE 9

Fluorination of Aluminum Oxide Particulates 1 g of aluminum oxide particulates (specific surface area: 100 m$^2$/g) prepared in Manufacturing Example 2 were filled into a reactor of atmospheric gas phase flow system and calcined as the pretreatment at 200° C. for 1 hour under reduced pressure.

After cooling to 150° C., gas obtained by diluting fluorine gas with nitrogen gas (fluorine gas content: 20% by volume) was charged into this reactor for 15 minutes to perform surface fluorination. The resulting surface-fluorinated aluminum oxide particulate had a specific surface area of 96 m$^2$/g and thus, maintained its high specific surface area. The fluorine content on the surface of aluminum oxide particulate was quantified by XPS and as a result, the fluorine atom was 46%. The results obtained are shown in Table 1.

EXAMPLE 10

Fluorination of Silicon Dioxide Particulates 1 g of silicon dioxide particulates (specific surface area: 120 m$^2$/g) prepared in Manufacturing Example 3 were filled into a reactor of atmospheric gas phase flow system and gas obtained by diluting fluorine gas with nitrogen gas (fluorine gas content: 20% by volume) was charged into this reactor at room temperature for 15 minutes to perform surface-fluoination. The resulting surface-fluorinated silicon dioxide particulate had a specific surface area of 120 m$^2$/g and thus, maintained its high specific surface area. The fluorine content on the surface of silicon dioxide particulate was quantified by XPS and as a result, the fluorine atom was 4%. The results obtained are shown in Table 1.

EXAMPLE 11

Fluorination of Silicon Dioxide Particulates 1 g of silicon dioxide particulates (specific surface area: 120 m$^2$/g) prepared in Manufacturing Example 3 were filled into a reactor of atmospheric gas phase flow system and gas obtained by diluting fluorine gas with nitrogen gas (fluorine gas content: 20% by volume) was charged into this reactor at 70° C. for 15 minutes to perform surface fluorination. The resulting surface-fluorinated silicon dioxide particulate had a specific surface area of 118 m$^2$/g and thus, maintained its high specific surface area. The fluorine content on the surface of silicon dioxide particulate was quantified by XPS and as a result, the fluorine atom was 4%. The results obtained are shown in Table 1.

EXAMPLE 12

Fluorination of Silicon Dioxide Particulates 1 g of silicon dioxide particulates (specific surface area: 120 m$^2$/g) prepared in Manufacturing Example 3 were filled into a reactor of atmospheric gas phase flow system and calcined as the pretreatment at 200° C. for 1 hour under reduced pressure. After cooling to 150° C., gas obtained by diluting fluorine gas with nitrogen gas (fluorine gas content: 20% by volume) was charged into this reactor for 15 minutes to perform surface fluorination. The resulting surface-fluorinated silicon dioxide particulate had a specific surface area of 115 m²/g and thus, maintained its high specific surface area. The fluorine content on the surface of silicon dioxide particulate was quantified by XPS and as a result, the fluorine atom was 4%. The results obtained are shown in Table 1.

EXAMPLE 13

Fluorination of Titanium Dioxide Particulates 1 g of titanium dioxide particulates (specific surface area: 55 m²/g) prepared in Manufacturing Example 1 were filled into a reactor of atmospheric gas phase flow system and calcined as the pretreatment at 200° C. for 1 hour under reduced pressure. After cooling to 70° C., gas obtained by diluting fluorine gas with nitrogen gas (fluorine gas content: 5% by volume) was charged into this reactor for 1 minute to perform surface fluorination. The resulting surface-fluorinated titanium dioxide particulate had a specific surface area of 55 m²/g and thus, maintained its high specific surface area. The fluorine content on the surface of titanium dioxide particulate was quantified by XPS and as a result, the fluorine atom was 8%. The results obtained are shown in Table 1.

EXAMPLE 14

Fluorination of Titanium Dioxide Particulates 1 g of titanium dioxide particulates (specific surface area: 55 m²/g) prepared in Manufacturing Example 1 were filled into a reactor of atmospheric gas phase flow system and calcined as the pretreatment at 200° C. for 1 hour under reduced pressure. After cooling to 20° C., gas obtained by diluting fluorine gas with nitrogen gas (fluorine gas content: 5% by volume) was charged into this reactor for 1 minute to perform surface fluorination. The resulting surface-fluorinated titanium dioxide particulate had a specific surface area of 55 m²/g and thus, maintained its high specific surface area. The fluorine content on the surface of titanium dioxide particulate was quantified by XPS and as a result, the fluorine atom was 4%. The results obtained are shown in Table 1.

COMPARATIVE EXAMPLE 1

NaF Treatment of Titanium Dioxide Particulates 10 g of titanium dioxide particulates (specific surface area: 55 m²/g) obtained in the Manufacturing Example 1 were calcined as the pretreatment at 600° C. for 1 hour and then dispersed in 25 ml of ion exchanged water to prepare a slurry having a pH of 4.5. This slurry was heated and kept at 50° C., and thereto 1.1 g of sodium fluoride (NaF) was added while stirring. Then, the slurry was stirred at 50° C. for 10 minutes. At this time, the slurry had a pH of 9.6. Further, titanium dioxide particulates treated with fluoride were separated by filtration, washed with water, dried at 110° C. for 5 hours and crushed in a ball mill for 5 hours. The resulting titanium dioxide particulate treated with fluoride had a specific surface area of 35 m²/g reduced from that before the treatment of 55 m²/g. The surface fluorine content was 7 atm. %. The results obtained are shown in Table 1.

TABLE 1

| | Fluorine Gas Concentration | Temperature at Modification with Fluorine | Surface Fluorine Content | Specific Surface Area |
|---|---|---|---|---|
| Example 1 | 20% | 20° C. | 10% | 55 m²/g |
| Example 2 | 20% | 70° C. | 14% | 51 m²/g |
| Example 3 | 20% | 150° C. | 19% | 52 m²/g |
| Example 4 | 1% | 20° C. | 12% | 55 m²/g |
| Example 5 | 20% | 20° C. | 22% | 53 m²/g |
| Example 6 | 20% | 70° C. | 24% | 52 m²/g |
| Example 7 | 20% | 20° C. | 21% | 98 m²/g |
| Example 6 | 20% | 70° C. | 31% | 95 m²/g |
| Example 9 | 20% | 150° C. | 46% | 96 m²/g |
| Example 10 | 20% | 20° C. | 4% | 120 m²/g |
| Example 11 | 20% | 70° C. | 4% | 118 m²/g |
| Example 12 | 20% | 150° C. | 4% | 115 m²/g |
| Example 13 | 5% | 70° C. | 8% | 55 m²/g |
| Example 14 | 5% | 20° C. | 4% | 55 m²/g |
| Comparative Example 1 | NaF | 50° C. | 7% | 35 m²/g |

Effect Example: Photochemical reaction catalyst reactivity of various titanium dioxide particulates Taking notice of the high photochemical reactivity of the surface-fluorinated titanium dioxide particulates prepared in Examples 1 to 3, Example 13, and Example 14 and NaF-treated titanium dioxide particulates, the photochemical reactivity was measured from the liquid phase oxidation reaction of tetralin using each titanium dioxide catalyst.

In this measurement, an oxygen absorption rate was measured using an apparatus shown in FIG. 1 by referring to the study of Kato et al (*Kogyo Kagaku Zasshi* (*Journal of Industrial Chemistry*), 63, 5, 748–750 (1960)) and the value obtained was shown as the photochemical activity. The measurement was performed by irradiating ultraviolet rays (1) while stirring with a stirrer (3) under conditions such that the amount of tetralin charged in a Pyrex glass reactor (5) was 20 ml, the amount of titanium dioxide charged was 0.02 g, the atmosphere was 02 and the reaction temperature was 40.1° C. in an incubator (2). The pressures were recorded using a differential pressure gauge (4) and changes in pressure were plotted every time period and the gradient (pressure change: mMH₂O/minute) was taken as the oxygen absorption rate.

The measurement results are shown in Table 2 together with the results obtained in the runs using tetralin containing no titanium dioxide and the runs using titanium dioxide particulates without surface fluorination treatment.

TABLE 2

| | Oxygen Absorption Rate (mmH₂O/min) |
|---|---|
| Example 1 | 7.5 |
| Example 2 | 8.2 |
| Example 3 | 7.1 |
| Example 13 | 10.5 |
| Example 14 | 12.0 |
| Tetralin | 7.5 |
| Untreated* | 13.5 |
| Comparative Example 1 | 13.3 |

*titanium dioxide particulate raw material not subjected to surface modification with fluorine Table 2 shows that fluorination of the surface of titanium dioxide particulates with fluorine gas according to the present invention allows inhibition of photochemical catalyst activity of titanium dioxide (Examples 1 to 3) and adjustment of the concentration of fluorine gas used upon fluorination reaction enables one to control the photochemical catalyst activity (Examples 13 and 14). Further, NaF-treated titanium dioxide particulates having an apparent surface fluorine atom of 7% (Comparative Example 1) had a photochemical catalyst activity which is not inhibited as compared with that prior to the treatment, which suggests that the surface of the NaF-treated titanium dioxide particulates were not substantially fluorinated.

USE EXAMPLES

Manufacture of Surface-Fluorinated Titanium Dioxide Particulates for Blending Into Thermoplastic Resin Composition 100 g of titanium dioxide particulates (specific surface area: 8 $m^2$/g, particle diameter: 0.21 $\mu$m) were filled into a reactor of atmospheric gas phase flow system and calcined as the pretreatment at 200° C. for 1 hour under reduced pressure.

After cooling to 20° C., gas obtained by diluting fluorine gas with nitrogen gas (fluorine gas content: 5% by volume) was charged into this reactor for 15 minutes to perform surface fluorination. The resulting surface-fluorinated titanium dioxide particulate had a specific surface area of 8 $m^2$/g and thus, maintained its high specific surface area. The fluorine content on the surface of titanium dioxide particulate was quantified by XPS and as a result, the fluorine atom was 10%.

Use Example 1

2 kg of fluorinated titanium dioxide particulates and 100 g of zinc stearate were mixed in a Henschel mixer to obtain a fluorinated titanium dioxide particulate pigment. Then, 1 kg of the pigment and 1 kg of low density polyethylene (JRex LDL 133K, Japan Polyolefins Co., Ltd) were mixed and molded using a twin-screw extruder to form pellets of about 3 mm in diameter and about 3 mm long, thus obtaining a master batch.

The moisture content of the master batch was measured by the above-described method was 220 ppm.

The master batch was kneaded with the above-described low density polyethylene (JRex LDL 133K) containing no pigment in a proportion of 1:0.667 using a Lab Plastomil (a 20ϕ extruder; Toyo Seiki Co. , Ltd.) at 150° C. for 30 minutes to prepare a resin composition. The composition hada moisture content of 150 ppm. Using the resin composition, a thin film layer of 20 $\mu$m thick was formed on a surface of 200 $\mu$m-thick high quality paper by a high temperature melt lamination method. The conditions of the surface of the thin film were observed visually and the degree of smoothness, foaming and microgrits were evaluated based on the following 4-rank standards of A to D according to the teaching of JP-B-2-38938. As a result, the resin composition was grouped as rank A and was of good quality.

A: Foaming and microgrits were minimal.
B: Less foaming but small amount of microgrit were observed.
C: Both foaming and microgrits occurred.
D; Both foaming and microgrits occurred in large amounts.

Use Example 2

2kg of fluorinated titanium dioxide particulates and 100 g of zinc stearate were mixed in a Henschel mixer to obtain a fluorinated titanium dioxide particulate pigment. Then, 1 kg of the pigment and 2 kg of polyimide were mixed and molded using a twin-screw extruder to form pellets of about 3 mm in diameter and about 3 mm long, thus obtaining a master batch. The moisture content of the master batch was measured by the above-described method was 150 ppm.

The master batch was kneaded with the above-described polyimide containing no pigment in a proportion of 1:0.67 using a Lab Plastomil (a 20ϕ extruder; Toyo Seiki Co., Ltd.) at 250° C. for 30 minutes to prepare a resin composition. The resin composition had a moisture content of 110 ppm.

Using the resin composition, a 20 $\mu$m-thick thin film was formed on a surface of 200 $\mu$m-thick high quality paper by a high temperature melt lamination method. The conditions of the surface of the thin film were observed visually and the degree of smoothness, foaming and microgrits were evaluated by 4-rankings of A, B, C, and D based on the same criteria as used in Use Example 1 above. As a result, the resin composition was grouped as rank A and was of good quality. The results obtained were put together and shown in Table 3.

Comparative Use Example 1

10 kg of commercially available anatase type titanium dioxide having an average particle diameter of 0.2 $\mu$m was dispersed in 80 L of purified water and an aqueous sodium aluminate solution was added in a predetermined amount such that the amount of treated titanium dioxide was 0.5% by volume as expressed as alumina after the surface treatment, followed by neutralization. Then, the product was filtered, heated at 100° C., and dried for 1 hour to obtain 9 kg of titanium dioxide surface-treated with alumina hydrate.

Then, 1 kg of the pigment powder thus obtained and 1 kg of low density polyethylene were mixed and molded using a twin-screw extruder to form pellets of about 3 mm in diameter and 3 mm long, thus obtaining a master batch.

The moisture content of the master batch was measured by the above-described method was 1940 ppm.

The master batch was kneaded with the above-described low density polyethylene containing no pigment in a proportion of 1:0.67 using a Lab Plastomil (a 20ϕ extruder; Toyo Seiki Co., Ltd.) at 150° C. for 30 minutes to prepare a resin composition. The composition had a moisture content of 1990 ppm.

Using the resin composition, a thin film layer of 20 $\mu$m thick was formed on a surface of 200 $\mu$-thick high quality paper by a high temperature melt lamination method. The conditions of the surface of the thin film were observed visually and the degree of smoothness, foaming and microgrit were evaluated based on the following 4-rankstandards in Use Example 1. As a result, the resin composition was grouped as rank D.

TABLE 3

|  | Ti content of fluorinated titanium oxide particulate | | Moisture content (ppm) | |
| --- | --- | --- | --- | --- |
|  | Heat treatment | Master batch | Resin composition | Master batch | Resin composition |
| Use Example 1 | 150° C. 0.5 hr | 50 | 30 | 220 | 150 |

TABLE 3-continued

| | | Ti content of fluorinated titanium oxide particulate | | Moisture content (ppm) | |
|---|---|---|---|---|---|
| | Heat treatment | Master batch | Resin composition | Master batch | Resin composition |
| Use Example 2 | 250° C. 0.5 hr | 50 | 30 | 150 | 110 |
| Comparative Use Example 1* | 150° C. 0.5 hr | 50 | 30 | 1940 | 1990 |

*Surface-nontreated titanium dioxide

What is claimed is:

1. A thermoplastic resin composition containing a surface-fluorinated titanium oxide particulate pigment, wherein the composition comprises a surface-fluorinated titanium oxide particulate pigment with a water content in the resin composition ranging from 10 to 1,400 ppm as determined by moisture conditioning 3 g of the composition in an atmosphere of 60° C. and a relative humidity of 60% for 4 hours, exposing the thus conditioned composition to an air stream of absolute humidity of 0.009 kg $H_2O$/kg of dry air at 80° C. for 4 hours, degassing the composition at 300° C. for 30 minutes, measuring the moisture content (g) of the composition using a Karl-Fischer moisture meter, and dividing the moisture content thus obtained by the surface-fluorinated titanium dioxide content (g).

2. A thermoplastic resin composition containing a surface-fluorinated titanium dioxide particulate pigment as claimed in claim 1, wherein the composition contains 20 to 80% by weight of the surface-fluorinated titanium dioxide particulate pigment.

3. A thermoplastic resin composition containing a surface-fluorinated titanium dioxide particulate pigment as claimed in claim 1 or 2, prepared by fluorinating titanium dioxide containing 0.001 to 0.2 parts by weight, per 100 parts by weight of titanium dioxide, of at least one of aluminum oxide, silicon oxide and zirconium oxide so that the surface fluorine content is 0.001 to 61% by weight, and then kneading the resulting surface-fluorinated titanium dioxide Particulate pigment with a thermoplastic resin.

4. A master batch of a thermoplastic resin composition containing a high concentration of surface-fluorinated titanium oxide particulate pigment, wherein the composition comprises a surface-fluorinated titanium oxide particulate pigment with a water content in the resin composition ranging from 10 to 1,400 ppm as determined by moisture conditioning 3 g of the composition in an atmosphere of 60° C. and a relative humidity of 60% for 4 hours, exposing the thus conditioned composition to an air stream of absolute humidity of 0.009 kg $H_2O$/kg of dry air at 80° C. for 4 hours, degassing the composition at 300° C. for 30 minutes, measuring the moisture content (g) of the composition using a Karl-Fischer moisture meter, and dividing the moisture content thus obtained by the surface-fluorinated titanium dioxide content (g).

5. The master batch of a thermoplastic resin composition containing a surface-fluorinated titanium oxide particulate pigment as claimed in claim 4, wherein the master batch contains 30 to 80% by weight of the surface-fluorinated titanium oxide particulate pigment.

6. A molded master batch of a thermoplastic resin composition containing a surface-fluorinated titanium dioxide particulate pigment as claimed in claim 4 or 5, prepared by fluorinating titanium dioxide containing 0.001 to 0.2 parts by weight, per 100 parts by weight of titanium dioxide, of at least one of aluminum oxide, silicon oxide and zirconium oxide so that the surface fluorine content is 0.001 to 61% by weight, kneading the resulting surface-fluorinated titanium dioxide particulate pigment with a thermoplastic resin, and extruding the resulting thermoplastic resin composition containing a surface-fluorinated titanium dioxide particulate pigment together with a substrate.

* * * * *